US006593568B1

(12) United States Patent
Whitehouse et al.

(10) Patent No.: US 6,593,568 B1
(45) Date of Patent: Jul. 15, 2003

(54) ATMOSPHERIC PRESSURE ION SOURCES

(76) Inventors: Craig M. Whitehouse, c/o Analytica of Branford, Inc. 29 Business Park Dr., Branford, CT (US) 06405; Bruce A. Andrien, Jr., c/o Analytica of Branford, Inc. 29 Business Park Dr., Branford, CT (US) 06405; Michael A. Sansone, c/o Analytica of Branford, Inc. 29 Business Park Dr., Branford, CT (US) 06405; Clement Catalano, 44 Kelsey Rd., Clinton, CT (US) 06413

( * ) Notice: Subject to any disclaimer, the term of this patent is extended or adjusted under 35 U.S.C. 154(b) by 0 days.

(21) Appl. No.: 09/324,401

(22) Filed: Jun. 2, 1999

(Under 37 CFR 1.47)

Related U.S. Application Data

(60) Provisional application No. 60/025,866, filed on Sep. 10, 1996.

(51) Int. Cl.[7] .......................... B01D 59/44; H01J 49/00
(52) U.S. Cl. ....................................... 250/288; 250/282
(58) Field of Search ................................ 250/282, 288, 250/292

(56) References Cited

U.S. PATENT DOCUMENTS

| | | | | | |
|---|---|---|---|---|---|
| 5,304,798 | A | * | 4/1994 | Tomany et al. | 250/288 |
| 5,352,892 | A | * | 10/1994 | Mordehai et al. | 250/288 |
| 5,672,868 | A | * | 9/1997 | Mordehai et al. | 250/292 |
| 5,844,237 | A | * | 12/1998 | Whitehouse et al. | 250/288 |
| 5,877,495 | A | * | 3/1999 | Takada et al. | 250/288 |
| RE36,892 | E | * | 10/2000 | Apffel et al. | 250/288 |

* cited by examiner

*Primary Examiner*—Bruce Anderson
(74) *Attorney, Agent, or Firm*—Levishon, Lerner, Berger & Langsam

(57) ABSTRACT

An Atmospheric Pressure Ion (API) source is configured for Electrospray (ES) and Atmospheric Pressure Chemical Ionization (APCI) operating modes. The API source includes a multipurpose heater assembly mounted in the API source chamber. The multipurpose heater supplies heat to the API chamber endplate, bath gas and entrance end of the capillary orifice into vacuum as well as supplying electrical connections to the API source elements. An additional heater is configured at the exit end of the capillary orifice into vacuum. With this configuration, the bath gas, endplate and capillary entrance temperature can be set independent of gas flow rate. The capillary exit and entrance temperatures can be set independently as well. The multipurpose endplate heater combined with the capillary exit heater allows the optimization of API source performance over a wide range of operating conditions and analytical applications.

68 Claims, 7 Drawing Sheets

ATMOSPHERIC PRESSURE ION SOURCES

RELATED APPLICATIONS

The present application claims the priority of U.S. Provisional Patent Application Serial No. 60/025,866 filed Sep. 10, 1996, the disclosure of which is fully incorporated herein by reference.

BACKGROUND OF THE INVENTION

Electrospray (ES) and Atmospheric Pressure Chemical Ionization Sources(APCI) produce ions at or near atmospheric pressure and are consequently referred to generically as Atmospheric Pressure Ion (API) Sources. Both ES and APCI sources produce ions for mass spectrometric analysis from liquid samples. Mass spectrometers operate in vacuum which is inherently incompatible with the direct analysis of liquid based samples. API sources serve to produce ions from a liquid sample, remove the unwanted sample liquid or vapor before it enters vacuum and efficiently transport the ions into vacuum for mass analysis with minimum vapor contamination. Electrospray can produce ions from sample liquid flow rates ranging from under 25 nanoliters per minute to over 2 milliliters per minute. APCI can generally be operated over a liquid flow rate range from 1 microliter to over 2 milliliters per minute. In both ES and APCI operating modes, heat must be applied as part of the ion production process to evaporate all or a portion of the solvent in which the sample of interest is dissolved. The Electrospray ion production process consists of both the production of charged liquid droplets and the evaporation of these droplets. During the evaporation of the Electrosprayed charged liquid droplets, ions are produced either substantially at atmospheric pressure or as the droplets are swept into vacuum. Droplet evaporation can be aided by heated capillaries, heated nozzle assemblies, heated “pepper pot” configurations countercurrent drying gas (or curtain gas) and/or heated countercurrent drying gas, concurrent gas flow and heated atmospheric pressure chamber walls, all of which are commercially available. The walls of ES and APCI atmospheric pressure chambers have also been heated to aid in evaporating the liquid droplets produced through gas and vapor conductance with the chamber walls. The use of drying gas and heated drying gas to aid in Electrosprayed droplet evaporation has been described in U.S. Pat. No. 4,531,056. Electrospray ion sources with heated drying gas configured with an external gas heater are commercially available. The disadvantage of an external gas heater as the single source of heat is that the enthalpy delivered to the ES chamber via the drying gas is dependent on the drying gas flow rate and temperature. Heated drying gas entering the ES source with low flow rate from an external heater can cool due to contact with the flow channels. The invention overcomes the disadvantages of an external drying gas heater by locating the drying gas in the ES source endplate. The endplate and capillary entrance temperature is maintained by direct contact with the endplate/gas heater independent of drying gas flow rate.

Heated capillaries and nozzles have been used to dry droplets produced in Electrospray sources in combination with and without drying gas or bath. U.S. Pat. No. 4,531,056 describes the configuration of heated drying gas in an ES source such that the drying gas heats the orifice into vacuum prior to flowing into the ES chamber. Similarly, dielectric capillary orifices into vacuum have been heated With drying gas flowing over a portion of the capillary length. The ability to change ion potential energy by using dielectric capillaries as orifices into vacuum configured in API sources is described in U.S. Pat. No. 4,542,293. Dielectric and metal capillaries configured in API sources are commercially available. U.S. Pat. No. 4,977,320 describes a heated metal capillary configured as an orifice into vacuum in an ES source with no drying gas. A single heater is described running the majority of the capillary length. This heated capillary technique is available in commercial API sources. In some commercially available systems, the walls of an API source have also been heated to generally increase the enthalpy available through gas and vapor heat conductance to aid in the evaporation of liquid sprayed into the API source. Auxiliary gas flows into API chambers have been configured in ES and APCI sources with flow introduction substantially in the direction toward the orifice into vacuum to aid in droplet drying and the transport of vapor. The invention includes the introduction of drying gas which flows in a direction substantially away from the orifice into vacuum. In this manner, unwanted neutral vapor is swept away from the orifice into vacuum minimizing contamination in the vacuum system. Ions, driven by the electric field, move against the drying gas toward the orifice into vacuum where they are entrained in the neutral gas and swept into vacuum. The invention provides control of API endplate, capillary entrance and exit and drying gas temperatures independent of drying gas flow rate. Heat is applied directly where it is required providing a compact cost effective and power efficient means to accomplish the API source requirements of droplet drying, minimizing vacuum system contamination and maximizing the ion transport efficiency into vacuum for mass analysis.

SUMMARY OF THE INVENTION

In accordance with the present invention a multiple purpose heater assembly is configured as an integral part of an Atmospheric Pressure Ion Source (API). The heater is constructed as part of an endplate assembly and is configured to provide heat to the API chamber endplate, the orifice into vacuum and the drying or bath gas which is delivered into the API source chamber. In one embodiment of the invention, the orifice into vacuum comprises a capillary and the integral heater supplies heat to the capillary entrance region. The invention also includes the addition of a second heater mounted near the capillary exit end. The temperature of the capillary entrance and exit ends can be controlled independently. The drying or bath gas passing through the heater achieves a temperature close to the heater temperature prior to entering the API chamber. The gas is not required to heat any elements on its way to the API chamber as is the case with an external gas heater. In the preferred embodiment of the invention, the heater and endplate assembly transfer heat to the bath gas prior to entering the API chamber. In this manner, the drying or bath gas temperature can be set substantially independent of flow rate. The heater assembly is configured such that minimum heat is shed to elements in the API source where heat would serve no purpose. The endplate lens is mounted off the API housing structure and in this embodiment can provide efficient transfer of heat to the gas and liquid in the API chamber with minimum enthalpy losses to the chamber walls. Heat applied to the bath gas, endplate and capillary allows efficient evaporation of droplets produced in an Electrospray source or prevents vapor from recondensing or entering the capillary in an APCI source, with minimum power supplied to the heater. Heat is supplied directly where it is most required minimizing power requirements and cost. The invention allows independent control of capillary entrance and exit temperatures as well as control of bath gas temperature independent of gas flow rate. Higher enthalpy can be transferred into the API source chamber with less wattage and with tighter temperature control, while the majority of API source elements need not be configured to withstand higher temperatures. The invention allows a wider range of optimization of API source variables to maximize performance over a broad range of liquid flow rates, solution chemistries and sample types. The independent heating provided by the integral endplate heater assembly with counter current drying gas and the capillary exit heater allows finer control of temperatures resulting in improved performance in Electrospray and Atmospheric Pressure Chemical Ionization sources operated at atmospheric pressure. The multiple purpose API source heater assembly includes API voltage and gas connections integrated into a single assembly which is configured for simple installation and removal. This integrated assembly facilitates assembly, disassembly and cleaning of the API source minimizing API source complexity and mass analyzer down time.

DETAILED DESCRIPTION OF THE INVENTION AND THE PREFERRED EMBODIMENTS

Charged droplets are produced in an Electrospray ion source when liquid is sprayed from an Electrospray needle tip with or without nebulization assist. An ES source can operate over a liquid flow range from under 25 nanoliters to over 2 milliliters per minute. The temperature and flow rate of bath or drying gas introduced into the ES source must be adjusted to achieve optimal ion production from evaporating charged droplets and achieve maximum transmission of ions into vacuum for different liquid flow rates sprayed into an Electrospray ion source. Different sample species and solvents may require different voltage and drying gas conditions to achieve optimal droplet evaporation even for the same liquid flow rates. For example molecules which are non covalently bound complexes sprayed in aqueous solutions require more enthalpy to achieve adequate charged droplet evaporation than solutions sprayed which contain a solvent with a lower specific heat such as methanol. The addition of independent heaters at the entrance and exit ends of the capillary orifice into vacuum creates added flexibility when setting drying gas temperature and flow rate. With the second capillary exit heater included, a broader range of drying gas flow rates and temperatures can be set and still yield optimal ES source performance. The ES drying gas heater assembly has been configured entirely in the ES source chamber allowing tighter control of the actual gas temperature entering the ES chamber near the capillary entrance orifice, With minimal temperature losses to the walls or housing of the ES chamber, drying gas temperature can be set substantially independent of the gas flow, within the limitations of heater wattage. With two independent entrance and exit capillary heaters, finer temperature control can be achieved of ions entering vacuum. Temperature can be set to compliment the capillary to skimmer voltage when desolvating ions or fragmenting ions with Collisional Induced Dissociation (CID).

Figure 1:
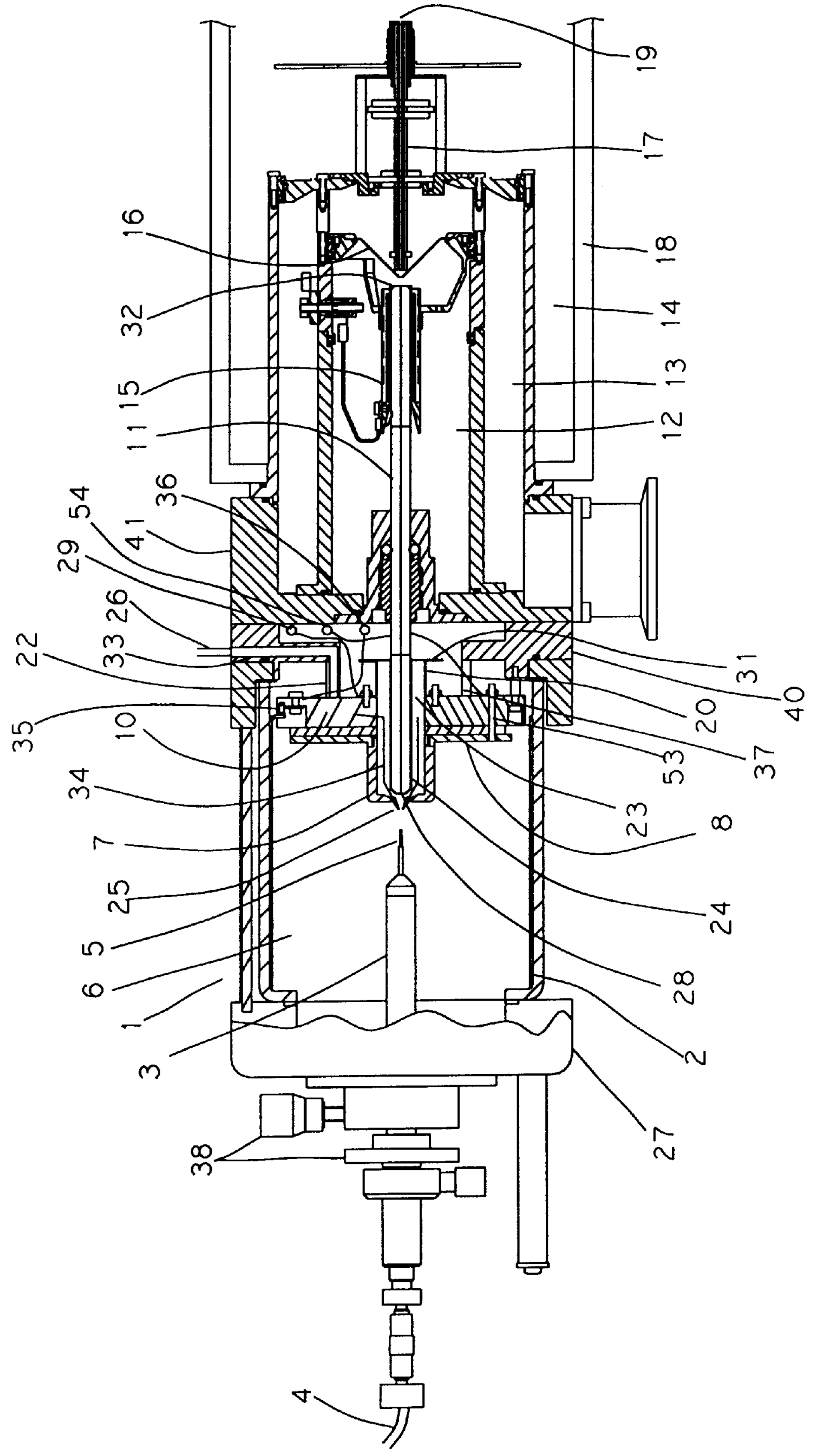
FIG. 1 is a cross section diagram of an Electrospray ion source which incorporates an integral bath gas, endplate and capillary entrance heater and a capillary exit heater.

The cross section of a preferred embodiment of the invention configured into an Electrospray ion source is shown in FIG. 1. The Electrospray source 1 includes, inlet ES probe 3, endplate 8, removable nosepiece 7, integral multiple purpose heater assembly 10, capillary 11, first vacuum pumping stage 12, second vacuum pumping stage 13, capillary exit heater assembly 15, skimmer 16 and multipole ion guide 17. ES source 1 assembly is mounted to vacuum housing 18 surrounding the third vacuum pumping stage 14. Ions produced in the ES source are delivered into vacuum, pass through skimmer 16 and multipole ion guide 17, exit ion guide 17 at exit end 32 and are mass analyzed. The mass analyzer configured downstream of ion guide 17 can be but is not limited to a quadrupole, ion trap, Time-OF-Flight, Fourier Transform, Magnetic Sector or a hybrid mass spectrometer. Sample bearing solution is introduced through ES source probe 3 from inlet tube 4. Solution exiting at ES probe tip 5 is sprayed as charged droplets into ES chamber 6. The charged droplets evaporate in the ES chamber to form ions which can be delivered into vacuum where they are mass analyzed. Voltages applied to ES probe tip 5, cylindrical lens 2, endplate 8 with removable nose piece 7 and capillary entrance 24 create electric fields which aid in charging the droplets as they are formed in the Electrospray or pneumatically assisted Electrospray process. Charged droplets sprayed from ES tip 5 and the ions produced from the charged droplets are driven by the electric fields towards capillary entrance orifice 28 against bath or drying gas flow 34 entering ES chamber 6 through nosepiece opening 25. Drying gas 35 aids in droplet evaporation while sweeping away undesirable neutral solvent vapor contamination from flowing into capillary orifice 28 and entering the vacuum region. The drying gas in the embodiment shown enters ES source chamber 6 in a direction substantially counter current to the gas flowing into the capillary orifice into vacuum. The drying gas flow rate and temperature can be adjusted to accommodate the extent of droplet evaporation required for a given Electrospray application to maximize ion production without applying excess heat which may cause unwanted fragmentation. In some analytical applications, additional heat is desired to increase ion internal energy to promote fragmentation in vacuum. To this end, drying gas temperature can be increased and additional heat can be added with a separate capillary exit heater 15. The embodiment of the invention includes an integral gas heater assembly 10 configured in ES chamber 6. Heater assembly 10 supplies heat to the ES endplate 8 with removable nosepiece 7, capillary entrance end 24 and drying gas 34. Endplate 8 and nosepiece 7 with heater assembly 10 are configured entirely within the ES source atmospheric chamber assembly 6. Heater 10 supplies heat to endplate 8 with direct contact to endplate 8 and heat is transferred from heater 10 to capillary entrance end 24 through contact 20. Contact 20 also serves as the electrical contact to connect voltage input 29 to the capillary entrance electrode at entrance end 24. In the embodiment shown, contact 20 is a flexible bellows which makes contact with capillary entrance electrode 31 when heater assembly 10 installed on housing 40 is mounted to vacuum housing 41. All electrical and gas connections to the endplate 8, heater assembly 10, capillary entrance 24 and cylindrical lens 2 are made through housing 40. These electrical and gas connections can be fed into housing 40 as a cable assembly or can be configured to make connections with a fixed counter connector assembly mounted on vacuum housing 41 when housing 40 is installed. With this configuration, endplate 8 and heater assembly 10 with housing 40 can be removed as a combined assembly in a simple manner when it is desirable to remove or clean capillary 11. Endplate 8, heater 10 and housing 40 assembly are fabricated of metal and ceramic materials to minimize the introduction of contamination peaks into the ES and APCI source chambers during operation. ES source chamber assembly 27 is removable from housing 40. After removal of ES chamber assembly 27, housing 40 can be removed as an assembly with heater assembly 10 attached by sliding contact 20 off entrance end 24 of capillary 11. Removing housing 40 and heater assembly 41, all electrical and gas connections for ES source 1 to external supplies are disconnected. With housing 40 installed, ES chamber assembly 27 to be installed and removed without the need to connect or disconnect any voltage or gas connections. When housing 40 is removed, capillary 11 can then be removed from the remaining vacuum housing 41 by sliding it out of capillary exit heater 15 and the vacuum O-ring seal mounted in the wall of vacuum housing 41 without disassembling any vacuum housings, couplings or components.

Capillary 11, in the embodiment shown is a dielectric capillary with metalized electrodes configured at the entrance and exit ends. Different voltages and temperatures can be applied at entrance and exit ends of dielectric capillary 11 due to its electrical insulating and low heat transfer properties. The dielectric capillary can be used to change the potential energy of ions traversing its length is described in U.S. Pat. No. 4,542,293. This allows the ES probe to be operated at ground potential while delivering ions into vacuum at any potential ranging thousands of volts from ground potential. In the embodiment shown in FIG. 1, voltages applied to cylindrical lens 2, endplate 8 and capillary entrance end 24 are typically −3,000 V, −4,000 V and −4,800 V respectively, for the production of positive ions in ES source 1. The voltage polarities are reversed for negative ES ion production. The absolute and relative voltages applied to ES probe 3, cylindrical lens 2, endplate 8 and capillary entrance 24 are controlled to optimize the Electrospray performance for different samples and solution types and different liquid flow rates. Alternatively, a metal capillary or nozzle can be configured as an orifice into vacuum. In this case the ES probe would be operated at high potential with cylindrical electrode 2, endplate 8 and capillary entrance 28 potentials operated at values closer to ground potential.

Figure 3:
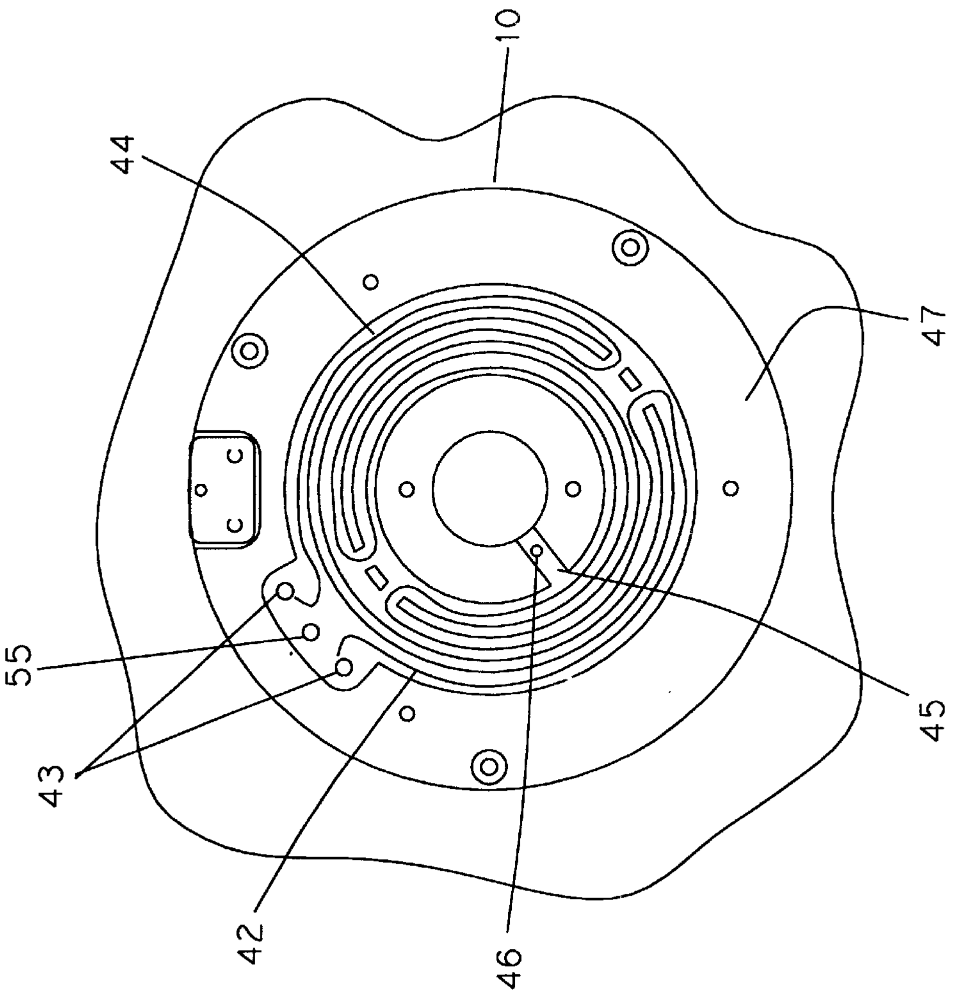
FIG. 3 is a cross section view the integral multipurpose heater assembly.

The axial and radial ES probe tip 5 position can be set with adjusters 38. As is known to one skilled in the art, different ES probe positions such as an off axis angled ES probe positions can be configured into the ES source. For example, ES probe positions can be set at an angle substantially perpendicular to the axis of ES source 1 and capillary 11. Such an arrangement is described in U.S. Pat. No. 5,495,108. Alternatively, a metal capillary or nozzle can be configured as an orifice into vacuum. As the entrance potentials of conductive orifices into vacuum are equal and ions delivered to vacuum must accommodate the ion energy requirements of the mass analyzer, the ES probe would need to be operated at high potential. The ES probe position, ES chamber voltages, drying gas flow rate and drying gas temperature can be adjusted to optimize Electrosprayed charged droplet production and evaporation. In the embodiment shown in FIG. 1, heat is applied to the drying or bath gas through heater assembly 10. One embodiment of heater assembly 10 with endplate 8 is shown in the exploded view of FIG. 4. A cross section view of view of the heater 10 is shown in FIG. 3.

Figure 4:
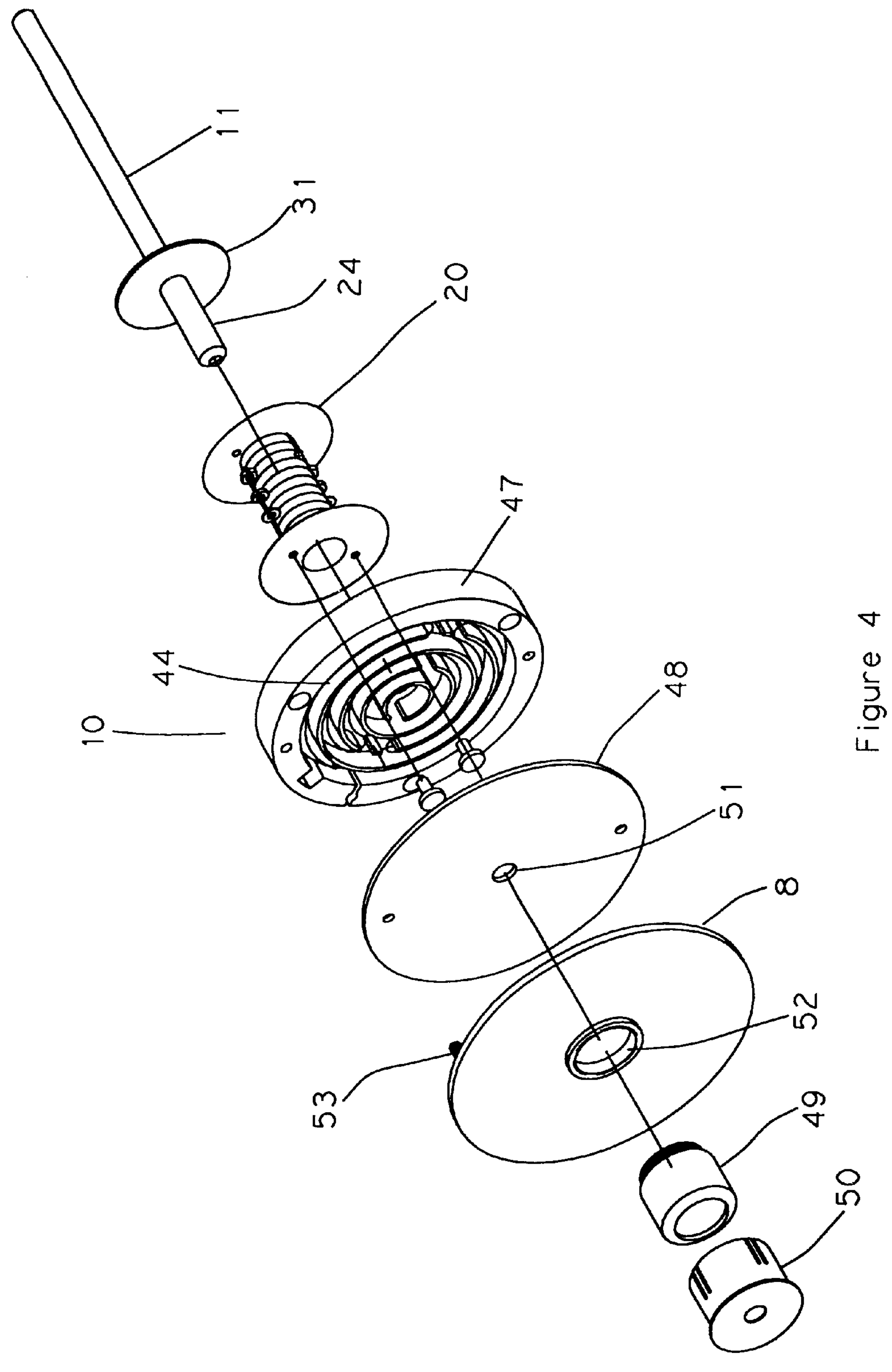
FIG. 4 is an exploded view of the integral endplate, gas and capillary heater assembly.

Gas enters ES source 1 through inlet tube 26 and channel 33 through housing 40. Gas channel 33 connects with the bore of heater standoff tube 22 directing gas flow into heater 10. Referring to FIG. 3, gas enters heater 10 through opening 55. Voltage is supplied to heater coil 42 through voltage feedthroughs 43. Heater coil 42 extends through channels 44 which direct the bath or drying gas flow to follow a circular repeating pattern until it exits near the heater center through exit channel 45. Gas flow enters from the outer edge of heater assembly 10 through opening 55 and is heated as it flow through channels 44 which include heater element 42. The gas enters on the outside edge of heater assembly 10 unheated and keeps the outside edge of the endplate heater assembly cooler than the region closer to the centerline. When higher drying gas flow rates are used, the temperature gradient increases towards the centerline. This is desirable as it concentrates the heat where the most enthalpy exchange is required, for example, to achieve sufficient droplet drying in high liquid flow rate applications. Thermocouple 46 is positioned in or near the exit channel as a temperature feedback to the temperature feedback circuit. Thermocouple 46 is also electrically isolated due to the heater ceramic body 47. Gas traveling through heater assembly 10 will attain substantially the temperature set on the temperature controller as monitored with thermocouple 46. Heater body 47 is configured with electrically insulating material such as ceramic which contributes minimal chemical contamination to the drying gas when heated. Referring to FIG. 4, an exploded view of heater 10 and endplate 8 assembly includes insulator disk 48, nosepiece 49 with nosepiece cap 50, capillary contact 20, capillary electrode hat section 31 and capillary 11. Metal contact 20 mounts on insulator heater body 47. Heater coil 42 is electrically insulated from contact 20 by the insulator heater body 47 and from the endplate 8 by insulator plate 48. The heater coil can be operated near ground potential and remain electrically isolated from the kilovolt potentials applied to contact 20 and endplate 8 with attached nosepieces 49 and 50. Voltage input 54 in FIG. 1 connects to endplate 8 through mounting bolt 53 which extends through insulators 48 and 47. Contact 35 supplying voltage from input 36 to cylindrical lens 2 is also mounted on heater assembly 10 with heater body 47 electrically insulating the kilovolt potentials applied to cylindrical lens 2 from the heater coil 42, thermocouple 46, endplate 8, contact 20 and capillary entrance 24 electrical elements.

When the heater assembly is installed in housing 40 and mounted to vacuum housing 41, the capillary electrode hat section 31 of capillary entrance end 24 contacts the bellows contact 20. This contact makes an electrical connection between the capillary entrance 24 and the voltage input 29 and forms a thermal conductance path between capillary entrance 24 and heater body 47. The electrically insulating material of heater body 47 and insulating plate 48 can be chosen to have reasonable thermal transfer properties. Specific formulations of ceramic, can be chosen as materials which satisfy this criteria. Multiple purpose heater assembly 10 serves as an endplate 8 heater, bath gas 34 heater and capillary entrance end 24 heater, electrical connector mount and electrical insulator and endplate mounting support. Heater assembly 10 is mounted to housing 40 through standoff mounts 37 and 22. The standoff mounts are configured to minimize the heat transfer from heater assembly 10 to housing 40. With the heat transferred to ES source housing 40 and vacuum housing 41 is minimized, heat supplied by heater 10, is applied only where it is needed to achieve the highest droplet drying efficiency for the lowest power consumption. Higher efficiency heat distribution lowers the cost of support electronics and manufacturing. Minimum heat transfer from heater 10 to housing 40 or vacuum housing 41 allows consistent and uniform Electrospray performance in ES chamber 6 independent of whatever mass spectrometer that ES source 1 is interfaced to. If ES source 1 which includes housing 40 is mounted to a vacuum housing 41 which has different heat sink characteristics, it will have little or no effect on the performance of heater 10. The same temperature setting and drying gas flow rate setting will have substantially the same droplet drying performance with the embodiment of heater 10 independent of whatever vacuum housing that ES source 1 is mounted to. Consequently, ES source performance for the embodiment shown in FIG. 1 will have improved consistency in performance for any given voltage and drying gas flow rate and temperature settings independent of the mass analyzer and vacuum housing to which it is mounted.

A capillary exit heater assembly 15 is configured into ES source 1 with attached vacuum stages 12 and 13 in the embodiment of the invention diagrammed in FIG. 1. Capillary exit heater 15 is configured to supply heat to the exit end of capillary 11 independent of capillary entrance heater 10. This allows fine tuning of performance over a wide range of liquid flow rates and broadens the range of drying gas flow rates and temperatures for which ion signal is maximized in ES and APCI operation. By independently heating the entrance and exit ends of the capillary, the capillary middle region remains at the lowest temperature along the length. The vacuum seal on the capillary is located at roughly the coolest point along the length and can be cooled by contact with vacuum housing 41. As the vacuum seal is usually a polymer material of limited temperature operating range, it is desirable to minimize the temperature to which this sealing element is exposed during operation. The reduced temperature also minimizes the chemical contamination which is given off by this seal that can contribute to unwanted peaks in the acquired mass spectra. Capillary 15 is a supplementary source of heat which may be used in high liquid flow rate applications where supplemental drying is required. Heat may also be applied to capillary exit heater 15 in applications where little or no heat is desired in the ES chamber but some enthalpy is required along the gas flow path into vacuum to insure droplet drying. One such application is the use of micro Electrospray tips which spray at liquid flow rates as low a 25 nanoliters per minute. When spraying with microtips, little or no heat may be applied to bath gas 34 as any heating of the sample solution in the microtip can cause sample decomposition. Optimal performance can be achieved with micro Electrospray tips by operating with a mild bath gas flow rate with little or no heat added to the gas supplemented by some heat added at the capillary exit, particularly when aqueous solutions are sprayed. Capillary exit heater 15 can raise the temperature of the gas and ions flowing through capillary 11 and exiting at capillary exit 32. It may be desirable in some analytical applications to increase ion internal energy to facilitate collisional induced dissociation in the region between capillary exit 32 and skimmer 16.

In practice, capillary heaters have been configured by a wrapping heater tape around a metal capillary or by passing current through the capillary and resistively heating it. Electrically conductive metal capillaries, however, do not allow the voltage of the capillary entrance and exit to be set independent of each other. With a dielectric or glass capillary this is possible. Heating dielectric capillaries has been supplied commercially by configuring a heater located. roughly halfway along the capillary length, supported by the capillary, which is electrically isolated from the two end electrodes. A heater supported by the capillary is problematic due to the fact capillary cleaning or replacement may require extensive API source disassembly. Furthermore, the purpose of a capillary heater is to raise the temperature of the expanding gas which is occurring most rapidly at the exit end of the capillary. Thus, the preferred location to introduce maximum enthalpy exchange to maintain or raise gas and ion temperature is at the exit end of the capillary. The embodiments of the capillary exit heater described herein facilitate insertion and removal of the capillary without API source disassembly. The capillary exit heater assemblies described support and position the capillary exit. The capillary exit heaters configurations described supply heat to the exit end of the capillary while allowing the application of different electrical potentials and temperatures to the entrance an exit ends of a dielectric capillary.

Figure 5:
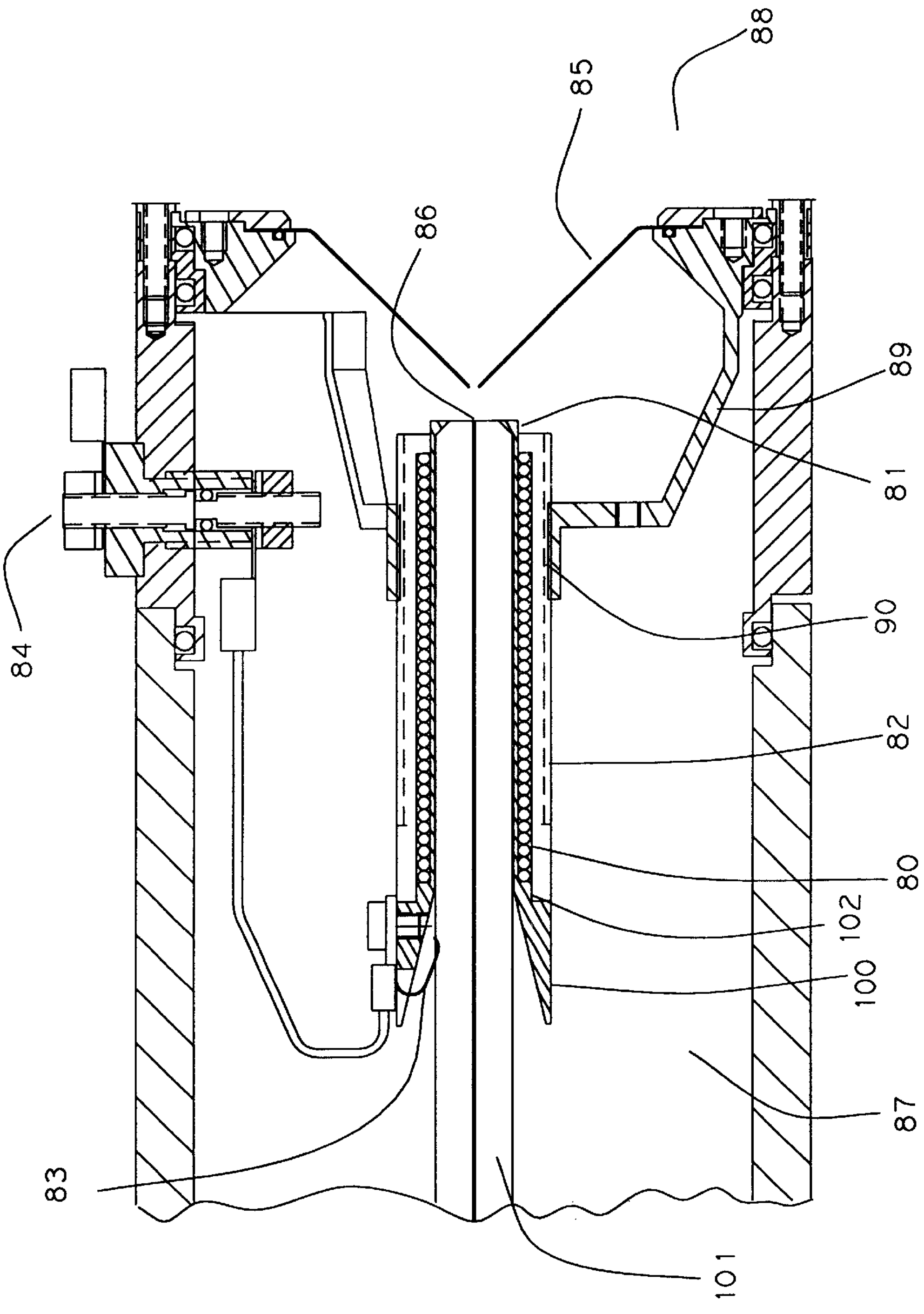
FIG. 5 is a cross section diagram of an embodiment of a tube shaped capillary exit heater.

A cross section of one embodiment of a capillary exit heater 102 is shown in FIG. 5. Capillary 101 is inserted into tube shaped endcap 81 at endcap entrance end 100. Electrical contact to the metalized exit end of capillary 101 is made via spring contact 83. Spring contact 83 is connected to electrical input 84 mounted through the wall of vacuum pumping stage 87. Heater coil 80 consists of a heater wire in a insulating sheath wound around metal endcap 81. The heater wire is electrically isolated from endcap 81 by its insulating sheath. Cylindrical insulator 82 surrounds heater coil 80 and electrically and to some degree thermally isolates heater coil 80 from mounting bracket 89. Cylindrical insulator 82 is threaded into bracket 89 at threaded portion 90. The capillary exit 86 to skimmer 85 position is set by threading cylindrical insulator 82 in or out of threading portion 90. Heat from the capillary exit heater is transferred to the gas and ions flowing through the capillary bore into vacuum through the walls of capillary 101. The voltage applied to coils 80 of capillary exit heater 102 and the composition and initial temperature of the gas expanding through the bore of capillary 101 affect the temperature of gas and entrained ions as they exit at capillary orifice exit 86. Gas and ions exiting orifice 86 form a free jet expansion in vacuum stage 87 with a portion of the expanding gas and ions passing through the orifice in skimmer 85 and continuing into vacuum stage 88. Capillary 101 can be removed by sliding capillary 101 out end 100 of capillary exit beater assembly 102. Capillary 101 can be removed from vacuum without the need to disassemble the API source or mass analyzer vacuum system. After removal of capillary 101, capillary exit heater assembly 102 remains in place, held by bracket 89. When capillary 101 is reinserted, into capillary exit heater assembly 102, endcap exit end 81 serves as a stop for the capillary depth, fixing the capillary exit orifice 86 to skimmer 85 distance. Mounting bracket 89 threadably connected to insulator 82 maintains the radial position of the capillary exit orifice 86 relative to the skimmer 85 orifice. Endcap 100 contact 83 serves to transfer the electrical connection to the capillary exit automatically when capillary 101 is inserted into capillary exit heater assembly 102.

Figure 6:
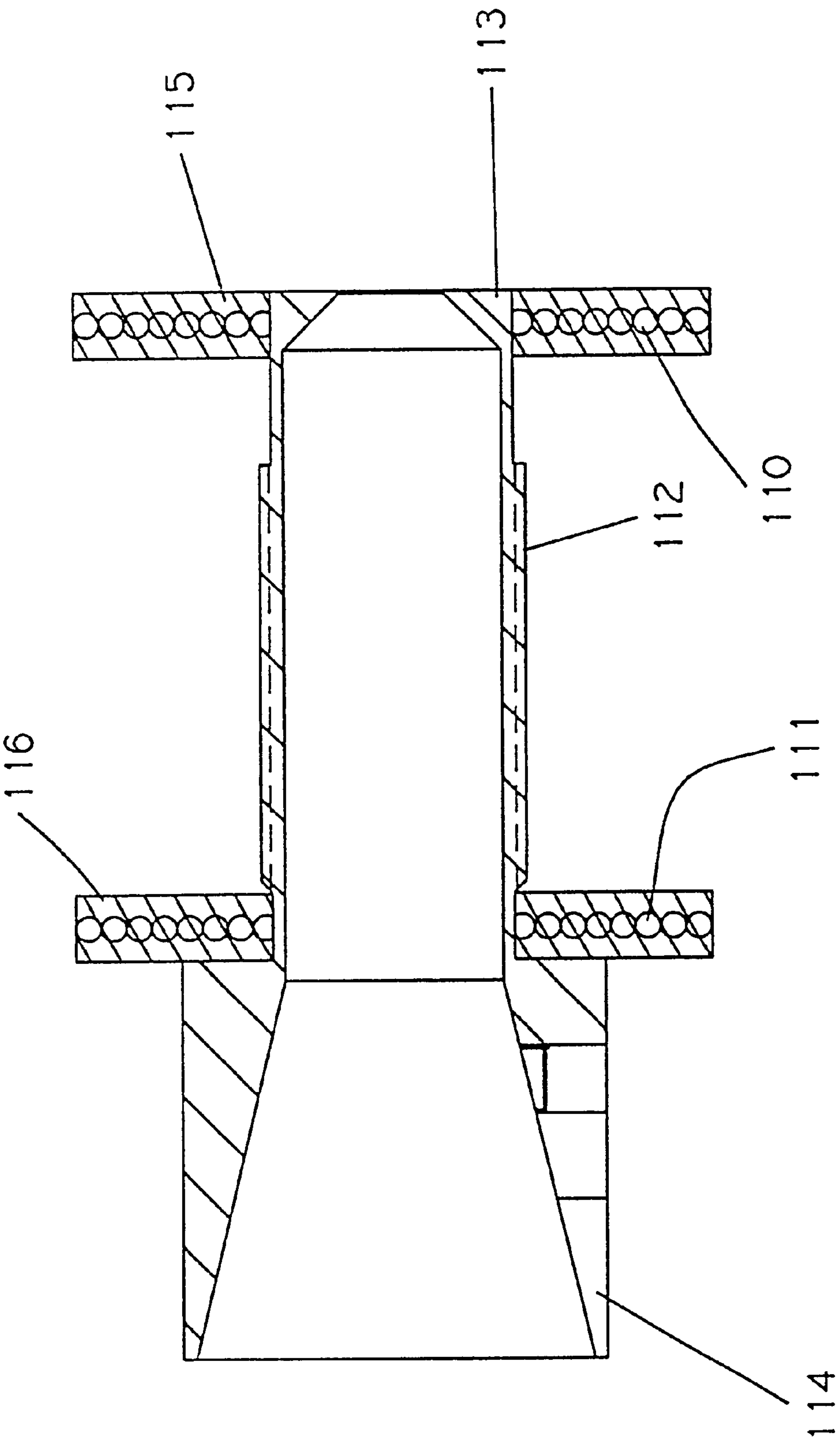
FIG. 6 is a cross section diagram of an embodiment of a dual disk capillary exit heater.
Figure 7:
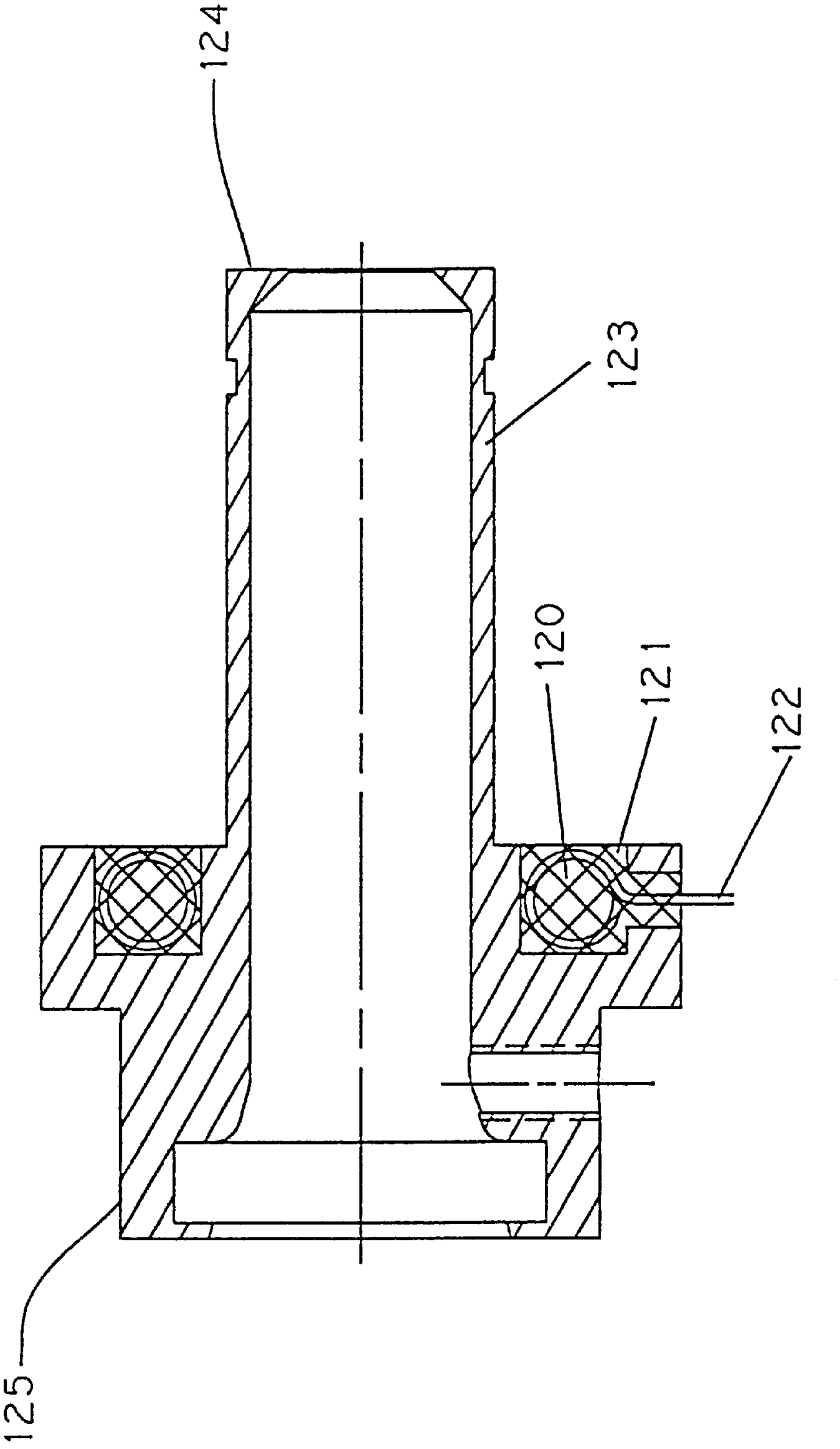
FIG. 7 is a cross section diagram of an embodiment of an integral circular coil capillary exit heater.

Another embodiment of a capillary exit heater is shown in FIG. 6. Heater disks 116 and 115 with insulated heater coils 111 and 110 respectively are attached to capillary endcap 112 near entrance end 114 and at exit end 113. Different temperatures can be set on heaters 116 and 115 or they can be operated as two coils in parallel. Heater assemblies 116 and 115 can be threaded or pressed onto endcap 112 allowing simple fabrication. The disk heaters can be placed on either side of the mounting support 90 or on both sides. Yet another embodiment of a capillary exit heater and endcap assembly 125 is shown in FIG. 7. Heater wire 122 forms a coil inside cavity 120 of endcap 123. Insulating material 121 electrically isolates heater wire 122 from the walls of cavity 120. This compact and inexpensive heater assembly slides over the capillary exit end with endcap face 124 serving as a stop for the inserted capillary exit face. In the three capillary exit heater embodiments shown in FIGS. 5, 6 and 7 the capillary tube can be removed from the heater assembly with no disassembly of the API source vacuum system required. The capillary heater assemblies remain in place. with capillary removal and reinsertion and serve to space the capillary exit from the skimmer, set the capillary exit orifice position radially with respect to the skimmer opening, supply the capillary exit electrical connection and deliver enthalpy to the capillary exit end which in turn heats the gas and ions flowing through the capillary.

Figure 2:
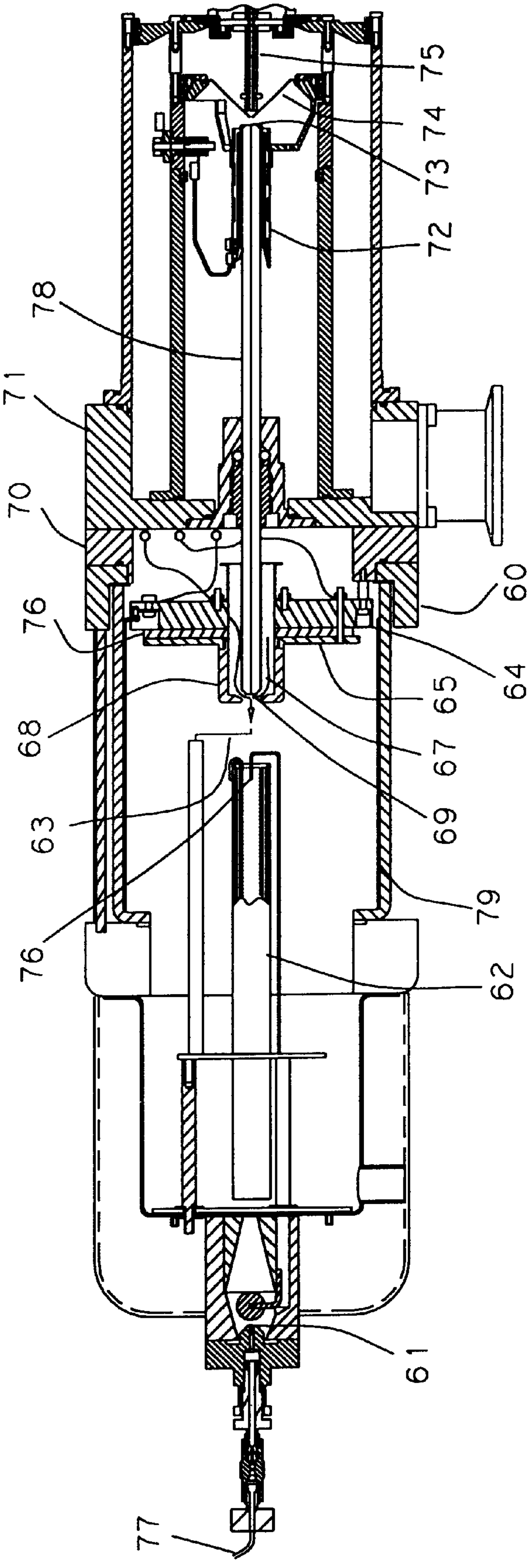
FIG. 2 is a cross section diagram of an Atmospheric Pressure Ion Source which incorporates a vaporizer heater, an integral bath gas, endplate and capillary entrance heater and a capillary exit heater.

A cross section of an alternative embodiment of the invention is shown in FIG. 2. In this embodiment, a multiple purpose heater assembly 64 with insulator plate 76, endplate 65 and nosepiece 68 is configured in Atmospheric Pressure Chemical Ionization source 60. Heater assembly 64 with endplate 65 is configured entirely within the APCI source atmospheric chamber assembly. APCI source 60 includes sample liquid inlet 77, nebulizer 61, vaporizer heater 62, thermocouple feedback sensor 76, corona discharge needle 63, heated bath gas 67, heater assembly 64, capillary 78, capillary exit heater assembly 72, skimmer 74 and multipole ion guide 75. Similar to the heater assembly 10 configured in the ES source diagrammed in FIG. 1, multiple purpose heater assembly 64 is mounted to housing 70 with standoffs to insure minimum heat transfer to housing 70 and vacuum housing 71. Heater assembly 64 serves the multiple purposes of heating drying or bath gas 67 supplied to heater assembly 64 via a connection gas flow connection fed through housing 70 and directing the gas flow into the APCI chamber substantially counter to the capillary orifice gas flow into vacuum. Heater assembly 64 also heats endplate 65 and the capillary entrance end through direct thermal contact and supplies electrical contacts to endplate 65, capillary entrance 69, the cylindrical lens 79, its heater coils and its thermocouple sensor as feedback for temperature control. Neutral vapor exiting vaporizer heater 62 and passing through the corona discharge region at the tip of corona discharge needle 63 is preventing from entering vacuum as. contamination by the bath gas flow 65 into the APCI chamber. The gas flow exiting vaporizer 62 and bath gas flow 67 exiting nosepiece 68 can be balanced to create a stagnation point to the nosepiece side of the tip of corona needle 63. Careful positioning of the opposing gas flow stagnation region can maximize the ion production efficiency from atmospheric pressure chemical ionization and improve the efficiency with which the ions are delivered into vacuum through capillary 78. Ions entering vacuum through capillary exit orifice 73 pass through skimmer 74 and into multipole ion guide 75. Multipole ion guide 74 can be operated in mass analysis mode or the ions can subjected to mass analysis after they pass through ion guide 75.

The temperature of the bath gas can be set and controlled independent of the bath gas flow rate into the APCI chamber and independent of the temperature delivered by the capillary exit heater. APCI chamber source 60 with nebulizer 6,1 vaporizer 62 and corona needle 63 is removable as an assembly. With APCI chamber assembly 60 removed, housing 70 with multiple purpose heater assembly 64 installed is removable as a unit by sliding heater 64 off the entrance end of capillary 78. Similar to the ES source embodiment shown in FIG. 1, the capillary is removable by sliding it out of fixed exit heater assembly 72 and the O-ring vacuum seal in vacuum housing 71 without the need to disassemble any vacuum components or connections. The multiple purpose bath gas heaters shown in FIGS. 1 and 2 as embodiments of the invention configured in ES and APCI sources, serve several functions as one assembly. Most of the voltages, gas flow and heat supplied to an ES and an APCI source can be provided by the multipurpose heater assembly. Assembly and disassembly of an API source is facilitated by this integrated multiple purpose heater assembly configuration. The multipurpose heater assembly can be configured with dielectric of metal capillaries or thin plate or nozzle orifices into vacuum. Independent capillary exit heaters can be configured in conjunction with the integral bath gas heater to allow independent control of capillary entrance and. exit temperatures. The integral multiple purpose heater assembly can be configured with different ES and APCI probe combinations as would be clear to one skilled in the art. Similarly, the capillary exit heater can be configured with different vacuum system components.

In addition to the disclosure set forth herein, additional background information is provided in U.S. Pat. No. 4,531,056, U.S. Pat. No. 4,542,293, U.S. Pat. No. 4,977,320 and U.S. Pat. No. 5,495,108, the disclosures of which are fully incorporated herein by reference. Having described this invention with regard to specific embodiments, it is to be understood that the description is not meant as a limitation since further modifications and variations may suggest themselves to those skilled in the art. It is intended that the present application cover all such modifications and variations as fall within the scope of the appended claims.

We claim:

1. An apparatus for producing ions from sample substances comprising:

(a) an ion source operated at substantially atmospheric pressure comprising a chamber;

(b) a vacuum region with a least one vacuum stage;

(c) an orifice into said vacuum region from said chamber;

(d) an inlet to introduce gas into said chamber at substantially atmospheric pressure;

(e) a heater housing located in said chamber proximate said orifice, said heater housing being connected to said inlet and comprising a heater to heat said gas within said heater housing to form heated gas, said heater assembly having an exit through which said heated gas exits said heater assembly to heat said orifice;

whereby a liquid sample substance is delivered to said chamber in which ions are created from said sample substance and said ions are directed into said orifice.

2. An apparatus according to claim 1, wherein said atmospheric pressure ion source comprises an Electrospray ion source.

3. An apparatus according to claim 1, wherein said atmospheric pressure ion source comprises an Atmospheric Pressure Chemical Ionization Source.

4. An apparatus according to claim 1, wherein said atmospheric pressure ion source comprises an Electrospray ion source with pneumatic nebulization assist.

5. Apparatus according to claim 4, wherein said heater housing is concentrically located around said orifice.

6. An apparatus according to claim 1, wherein said orifice is located at the entrance end of a capillary tube.

7. An apparatus according to claim 6, further comprising a separate heater located along the length of said capillary tube.

8. Apparatus according to claim 6, wherein said capillary tube has an exit orifice and said separate heater is located proximate said exit orifice of said capillary tube.

9. An apparatus according to claim 1, further comprising an endplate in said chamber holding said heater assembly in places wherein said heater supplies heat to said orifice and to said endplate, said endplate terminating proximate to said orifice.

10. An apparatus according to claim 9, wherein said endplate is concentrically positioned around said orifice in said chamber.

11. Apparatus according to claim 9, wherein said endplate uniformly surrounds said orifice.

12. Apparatus according to claim 9, wherein said endplate is integrally connected with said heater housing.

13. An apparatus according to claim 1, wherein said heated gas is introduced into said chamber in a direction substantially counter current to gas and ion flow through said orifice into vacuum.

14. Apparatus according to claim 1, wherein said heater housing comprises heater coils through which gas passes to be heated before exiting said heater housing.

15. Apparatus according to claim 14, further comprising a temperature sensitive element located proximate said exit of said heater housing to control the temperature of said heater.

16. Apparatus according to claim 1, wherein the heat provided by said heater is adjustable.

17. Apparatus according to claim 16, wherein the rate of gas flow through said inlet is adjustable.

18. An apparatus for producing ions from sample substances comprising:

(a) an ion source operated at substantially atmospheric pressure comprising a chamber;

(b) a vacuum region with a least one vacuum chamber;

(c) an orifice into said vacuum region;

(d) an inlet to introduce gas into said chamber;

(e) a heater housing located in said chamber proximate said orifice, said heater housing being connected to said inlet and comprising a heater to heat said gas within said heater housing to form heated gas, said heater assembly having an exit through which said heated gas exits said heater assembly to heat said orifice;

whereby a liquid sample substance is delivered to said chamber in which ions are created from said sample substance, and said ions are directed into said orifice of said capillary tube.

19. An apparatus according to clime 18, wherein said atmospheric pressure ion source comprises an Electrospray ion source.

20. An apparatus according to claim 18, wherein said atmospheric pressure ion source comprises an Atmospheric Pressure Chemical Ionization Source.

21. An apparatus according to claim 18, wherein said atmospheric pressure ion source comprises an Electrospray ion source with pneumatic nebulization assist.

22. An apparatus according to claim 18, wherein said orifice is located at the entrance end of a capillary tube.

23. An apparatus according to claim 22, further comprising a separate heater located along the length of said capillary tube.

24. An apparatus according to claim 18 wherein said heater supplies heat to an endplate positioned in said chamber.

25. An apparatus according to claim 18, wherein said heated gas is introduced into said chamber in a direction substantially counter current to gas flow through said orifice into vacuum.

26. An apparatus for producing ions from sample substances comprising:

(a) an ion source operated at substantially atmospheric pressure comprising a chamber;

(b) a vacuum region with a least one vacuum stage;

(c) an orifice into said vacuum region from said chamber;

(d) an inlet to introduce gas into said chamber at substantially atmospheric pressure;

(e) a heater mounted inside said chamber to heat said gas introduced through said inlet to said heater concurrently heating said orifice and an endplate configured in said chamber whereby a liquid sample substance is delivered to said chamber in which ions are created from said sample substance and said ions are directed into said orifice.

27. An apparatus according to claim 26 wherein said endplate is mounted to said heater.

28. An apparatus according to claim 26, wherein said atmospheric pressure ion source comprises an Electrospray ion source.

29. An apparatus according to claim 26, wherein said atmospheric pressure ion source comprises an Atmospheric Pressure Chemical Ionization Source.

30. An apparatus according to claim 26, wherein said atmospheric pressure ion source comprises an Electrospray ion source with pneumatic nebulization assist.

31. An apparatus according to claim 26, wherein said orifice is a capillary tube.

32. An apparatus according to claim 31, wherein said capillary tube is configured with a separate heater located along its length.

33. An apparatus according to claim 26, wherein said gas is introduced into said chamber in a direction substantially counter current to gas flow through said orifice into vacuum.

34. An apparatus for producing ions from sample substances comprising:

(a) an ion source operated at substantially atmospheric pressure comprising a chamber;

(b) a vacuum region with a least one vacuum stage;

(c) a capillary tube having an entrance orifice from said chamber into said vacuum region;

(d) an inlet to introduce gas into said chamber at substantially atmospheric pressure;

(e) a heater mounted inside said chamber to heat said gas from said inlet, said heated gas heating said orifice and an endplate configured in said chamber;

(f) said capillary tube configured with a separate heater located along its length;

whereby a liquid sample substance is delivered to said chamber in which ions are created from said sample substance and said ions are directed into said orifice.

35. An apparatus according to claim 34 wherein said endplate is mounted to said heater.

36. An apparatus according to claim 34, wherein said atmospheric pressure ion source comprises an Electrospray ion source.

37. An apparatus according to claim 34, wherein said atmospheric pressure ion source comprises an Atmospheric Pressure Chemical Ionization Source.

38. An apparatus according to claim 34, wherein said atmospheric pressure ion source comprises an Electrospray ion source with pneumatic nebulization assist.

39. An apparatus according to claim 34, wherein said capillary tube comprises an exit orifice and said separate heater heats said exit orifice.

40. An apparatus, for analyzing chemical species comprising:

(a) an ion source operated at substantially atmospheric pressure comprising a chamber;

(b) a vacuum region with a least one vacuum stage;

(c) a mass analyzer and detector configured in said vacuum region;

(d) an orifice into said vacuum region from said chamber;

(e) an inlet to introduce gas into said chamber at substantially atmospheric pressure;

(f) a heater housing located in said chamber proximate said orifice, said heater housing being connected to said inlet and comprising a heater to heat said gas within said heater housing to form heated gas, said heater assembly having an exit through which said heated gas exits said heater assembly to heat said orifice;

whereby a liquid sample substance is delivered to said chamber in which ions are created from said sample substance, and said ions are directed into said orifice.

41. An apparatus according to claim 40 wherein said atmospheric pressure ion source comprises an Electrospray ion source.

42. An apparatus according to claim 40, wherein said atmospheric pressure ion source comprises an Atmospheric Pressure Chemical Ionization Source.

43. An apparatus according to claim 40, wherein said atmospheric pressure ion source comprises an Electrospray ion source with pneumatic nebulization assist.

44. An apparatus according to claim 40, wherein said orifice is formed in a capillary tube.

45. An apparatus according to claim 44, wherein said capillary tube is configured with a separate heater positioned along its length.

46. An apparatus according to claim 45, wherein said capillary tube has an exit orifice and said separate heater heats said exit orifice.

47. An apparatus according to claim 45, further comprising an endplate in said chamber holding said heater assembly in place, wherein said heater supplies heat to said orifice and to said endplate, said endplate terminating proximate to said orifice.

48. An apparatus according to claim 45, wherein said gas is introduced into said chamber in a direction substantially counter current to gas flow through said orifice into vacuum.

49. An apparatus according to claim 45, wherein said mass analyzer comprises a Time-Of-Flight mass analyzer.

50. An apparatus according to claim 44, wherein said mass analyzer comprises a quadrupole mass analyzer.

51. An apparatus according to claim 44, wherein said mass analyzer comprises an ion trap mass analyzer.

52. An apparatus according to claim 44, wherein said mass analyzer comprises a Fourier Transform mass analyzer.

53. An apparatus according to claim 44, wherein said mass analyzer comprises a magnetic sector mass analyzer.

54. A method of producing ions from a sample substance comprising:

(a) utilizing an atmospheric pressure ion source with a chamber, a vacuum region and an orifice into said vacuum region from said chamber;

(b) introducing bath gas into said chamber substantially at atmospheric pressure through an inlet;

(c) locating a heater in said chamber between said inlet and said chamber;

(d) passing said bath gas through said heater to heat said bath gas;

(e) exiting said heated bath gas proximate said orifice to heat said orifice, (f) introducing a liquid sample substance into said ion source, (g) producing ions in said ion source, and delivering said ions into said vacuum region by passing said ions and said liquid sample by said orifice.

55. A method according to claim 54, wherein said ions are produced by Electrospray ionization.

56. A method according to claim 54, wherein said ions are produced by an Atmospheric Pressure Chemical Ionization.

57. A method according to claim 54, wherein said ions are produced by Electrospray ionization with pneumatic nebulization assist.

58. A method according to claim 54, connecting an endplate to said heater in said chamber, locating said endplate within said chamber and heating both said endplate and said orifice with said bath gas.

59. Apparatus for producing ions from a sample substance comprising:

(a) an atmospheric pressure ion source with a chamber, a first heater mounted inside said chamber, a vacuum region, a capillary connected between said chamber, and said vacuum region passing ions into said vacuum region, a second heater positioned on said capillary, said capillary having an entrance orifice and an exit orifice;

(b) an inlet for carrying bath gas into said chamber substantially at atmospheric pressure;

(c) said bath gas passing from said inlet through said first heater to be heated thereby, said first heater directing the heated bath gas toward said capillary entrance orifice to heat said orifice, whereby said capillary is heated by two independent sources of heat;

wherein said vacuum region is connected to a mass analyzer.

60. Apparatus according to claim 59, wherein said ion source comprises an Electrospray ion source.

61. Apparatus according to claim 59, wherein said ion source comprises an Atmospheric Pressure Chemical ion source.

62. Apparatus according to claim 59, wherein said ion source comprises an Electrospray ion source with pneumatic nebulization assist.

63. Apparatus according to claim 59, wherein said mass analyzer comprises a Time-Of-Flight mass analyzer.

64. Apparatus according to claim 59, wherein said mass analyzer comprises a Quadrupole.

65. Apparatus according to claim 59, wherein said mass analyzer comprises an ion trap mass analyzer.

66. Apparatus according to claim 59, wherein said mass analyzer comprises a Fourier Transform mass analyzer.

67. Apparatus according to claim 59, wherein said mass analyzer comprises a magnetic sector mass analyzer.

68. Apparatus according to claim 59 wherein said capillary has an exit orifice and said second heater is positioned at said exit orifice.

* * * * *

UNITED STATES PATENT AND TRADEMARK OFFICE

CERTIFICATE OF CORRECTION

PATENT NO. : 6,593,568 B1
APPLICATION NO. : 09/324401
DATED : July 15, 2003
INVENTOR(S) : Craig M. Whitehouse et al.

It is certified that error appears in the above-identified patent and that said Letters Patent is hereby corrected as shown below:

Title page, Item (60), Related U.S. Application Data, before "Provisional application" insert --Continuation of application No. 08/927,223, filed September 10, 1997, now abandoned, which claims benefit to--

Column 1, Line 4, delete paragraph beginning with "The present application claims the priority to U.S. Provisional Patent Application Serial No. 60/025,866 filed September 10, 1996, the disclosure of which is fully incorporated herein by reference." insert new paragraph --The present application claims the priority to U.S. Application No. 08/927,223, filed September 10, 1997, now abandoned, which claims priority to U.S. Provisional Patent Application Serial No. 60/025,866, filed September 10, 1996, the disclosure of which is fully incorporated herein by reference.--

Signed and Sealed this
Twenty-seventh Day of September, 2011

David J. Kappos
*Director of the United States Patent and Trademark Office*